(12) United States Patent
Rau et al.

(10) Patent No.: US 7,239,462 B2
(45) Date of Patent: Jul. 3, 2007

(54) OBJECTIVE WITH AT LEAST ONE OPTICAL ELEMENT

(75) Inventors: Johannes Rau, Gerstetten (DE); Armin Schoeppach, Aalen (DE); Ulrich Weber, Ulm (DE)

(73) Assignee: Carl Zeiss SMT AG, Oberkochen (DE)

( * ) Notice: Subject to any disclaimer, the term of this patent is extended or adjusted under 35 U.S.C. 154(b) by 12 days.

(21) Appl. No.: 11/063,113

(22) Filed: Feb. 22, 2005

(65) Prior Publication Data
US 2005/0190462 A1  Sep. 1, 2005

(30) Foreign Application Priority Data
Feb. 26, 2004  (DE) .................. 10 2004 009 240

(51) Int. Cl.
*G02B 7/02* (2006.01)
(52) U.S. Cl. .................................... 359/819
(58) Field of Classification Search ............... 359/694, 359/696, 819, 820, 822–830, 808, 811–813
See application file for complete search history.

(56) References Cited

U.S. PATENT DOCUMENTS 5,822,136 A * 10/1998 Semrad et al. ............... 359/818
6,191,898 B1 * 2/2001 Trunz et al. ................. 359/819
6,229,657 B1   5/2001 Holderer et al. ............ 359/822
6,239,924 B1   5/2001 Watson et al. .............. 359/819

FOREIGN PATENT DOCUMENTS

DE   199 01 295 A1   7/2000
WO   WO 03/040785 A1   5/2003

* cited by examiner

*Primary Examiner*—Ricky Mack
*Assistant Examiner*—M. Hasan
(74) *Attorney, Agent, or Firm*—Welsh & Katz, Ltd.

(57) ABSTRACT

An objective (2) with at least one optical element (4), which is mounted in an inner ring (3). The inner ring (3) is connected to an outer mount (1). A manipulator (10) is provided for displacing the optical element (4) in at least a direction perpendicular to an optical axis. The inner ring (3) is connected to the outer mount (1) by means of at least two adjusting joints (5) with manipulators (10) and at least one swivel joint (6). The at least two adjusting joints (5) and the at least one swivel joint (6) are provided with joint arms (8) extending at least approximately in a tangential direction with respect to the inner ring (3), by means of which arms the inner ring (3) is elastically connected to the outer mount (1). The ends of the joint arms (8) are articulated on the inner ring (3) in such a way that temperature-induced changes in length of the joint arms (8) are converted into a uniform turning direction of the inner ring (3) with respect to the outer mount (1) about the center of the optical element.

21 Claims, 3 Drawing Sheets

OBJECTIVE WITH AT LEAST ONE OPTICAL ELEMENT

BACKGROUND OF THE INVENTION

1. Field of the Invention

The invention relates to an objective with at least one optical element, which is mounted in an inner ring, the inner ring being connected to an outer mount, and with a manipulator device for displacing the optical element in at least a direction which lies perpendicular or at any desired angle to the optical axis, the inner ring being connected to the outer mount by means of at least two adjusting joints with manipulator members and at least one swivel joint, the at least two adjusting joints and the at least one swivel joint being provided with joint arms extending at least approximately in a tangential direction with respect to the inner ring, by means of which arms the inner ring is elastically connected to the outer mount.

An objective of this type with a manipulator device is known from DE 199 01 295 A1.

2. Description of the Related Art

With a manipulator device of this type, it is intended to improve the optical imaging quality of an objective. To compensate for production tolerances in an objective, an optical element is displaced in a direction which lies perpendicular or at any desired angle to the optical axis in a path-controlled defined manner with a construction which is optimized with respect to flux of force and stiffness.

The outer mount, inner ring and manipulation device in this case form a unit, in particular if the inner ring and the outer mount are of one piece. With the manipulator members, an elastic or compliant connection can be created between the outer mount and the inner ring, achieving a compliance or possibility of displacement in the x and y directions while at the same time, however, there is great stiffness in the z direction, i.e. in the direction of the optical axis.

If the optical element, for example a lens, heats up, there is the problem that the heat can be dissipated only poorly on account of the few and narrow connecting points with respect to the outer mount via the joint arms. This means that differences in temperature may occur between the optical element with its inner mount and the outer mount, which can have adverse effects on the imaging quality. In particular, changes in length of the joint arms on account of changes in temperature lead to a relative displacement of the inner ring with respect to the outer mount in the x-y plane. This displacement is based essentially on the articulation of the joint arms of the adjusting joints on the inner ring and their longitudinal extent. The resultant displacement of the inner ring transversely to the z axis leads to aberrations, in particular to coma.

SUMMARY OF THE INVENTION

The present invention is therefore based on the object of improving an objective with at least one optical element by appropriate mounting of the optical element in such a way that no aberrations occur, in particular not when there are differences in temperature.

This object is achieved according to the invention by an objective comprising at least one optical element, said optical element being mounted in an inner ring, said inner ring being connected to an outer mount making a connection, said connection comprising articulated arms being roughly tangential to said inner ring, wherein temperature-induced changes in length of said articulated arms result in a rotation of said inner ring with respect to said outer mount, said rotation being roughly around the center of said optical element.

In a preferred embodiment of the invention this object is achieved by an objective comprising at least one optical element, said optical element being mounted in an inner ring, said inner ring being connected to an outer mount elastically making an elastic connection, said elastic connection comprising a manipulator and at least one swivel joint, said manipulator being capable to displace the inner ring in at least one direction and comprising at least two articulated joints, said at least two articulated joints and said at least one swivel joint being provided with articulated arms, said articulated arms being roughly tangential to said inner ring and providing said elastic connection, wherein temperature-induced changes in length of said articulated arms result in a rotation of said inner ring with respect to said outer mount, said rotation being roughly around the center of said optical element.

The displacement of the inner ring by the manipulator can be perpendicular to an optical axis, which means in the x-y plane.

The arrangement according to the invention of the joint arms and their articulation on the inner ring have the effect that unavoidable changes in length when there are differences in temperature no longer lead to a displacement of the optical element, but only to a rotation about the center of the lens. Plain rotations of an optical element are generally much less problematical in comparison with displacements with respect to the z axis. In the case of a lens as the optical element, a rotation generally does not lead to any losses in quality with respect to the imaging quality of the objective.

In a very advantageous and unobvious development of the invention, it may be provided that the at least one swivel joint is likewise formed as an adjusting joint with a manipulator member. In this case, all the adjusting joints may then advantageously be distributed symmetrically around the circumference of the inner ring, in particular at intervals of 120°.

The formation of all three joints as adjusting joints provides better possibilities for adjustment. In addition, in this case there is no longer any preferential direction. This means that the entire system becomes more stiff, to be precise more uniform in all directions.

If the three adjusting joints are arranged in the manner specified or symmetrically, the points of rotation in a manipulation lie significantly further away from the z axis in each case, and consequently significantly outside the optical element. This results in a much greater adjusting radius, which has the effect of greater linearity with the small adjusting paths, which lie in the micrometer range.

Advantageous developments and configurations are provided by the remaining subclaims and the exemplary embodiments that are described in principle on the basis of the drawing, in which:

DETAILED DESCRIPTION

Figure 1:
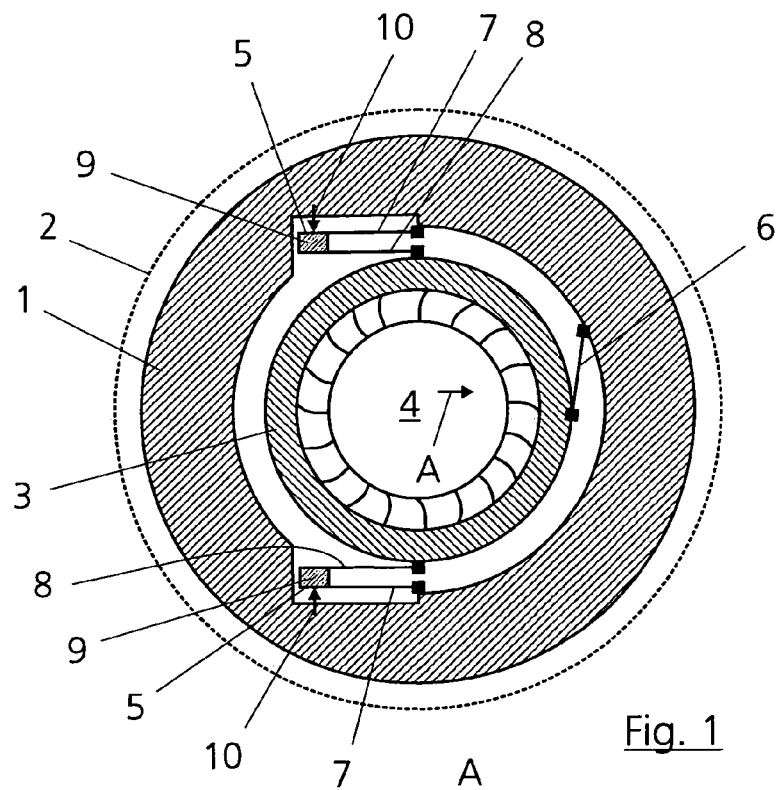
FIG. 1 shows a schematic plan view of a lens as the optical element of an objective with a mounting according to the prior art.

FIG. 1 shows in a plan view an outer mount 1, which is arranged in a housing of an objective 2, which is only represented in principle by means of dashed lines. The objective can be formed as a projection objective in microlithography for the manufacture of semiconductor chips as disclosed in EP 0660 188 B1, which is incorporated herewith and likewise constitutes the disclosure of the present application. Inside the outer mount 2 there is an inner ring 3, which bears a lens 4 as the optical element, in a way not represented in any more detail. The connection between the inner ring 3 and the outer mount 1 takes place by means of two adjusting joints 5, which are arranged opposite each other, and a swivel joint 6. While the swivel joint 6 comprises only one joint arm, which at its two ends is connected respectively to the inner ring 3 and the outer mount 1, the two adjusting joints 5 each have two joint arms 7 and 8, which are connected to each other at their two free ends by means of an adjusting part 9. With the end of the joint 7 and 8 that is respectively remote from the adjusting part 9, said arm is connected to the inner mount 3 and to the outer mount 1, respectively.

For the displacement of the inner ring 3 with respect to the outer mount 1, actuators 10, which are only represented in FIG. 1 in a simplified form by arrows, act on the adjusting parts 9.

The arrangement of the joint arms produces two centers of rotation at the points of intersection of the tangents of the connecting points. When the adjusting parts are actuated, the inner ring 3 rotates about the respectively corresponding center of rotation, the great radius and the small adjusting path in the micrometer range meaning that the rotation can be regarded as a linear movement of the optical element.

For further details, reference is made to DE 199 03 295 A1, which likewise constitutes the disclosure of the present application.

In the case of the configuration according to the prior art, the two joint arms 8 extend from the inner ring 3, on which they are articulated with one end, in the same direction (in the case of the representation chosen, in the direction of the negative x axis). If differences in temperature between the lens 4 and the inner ring 3 connected to it then lead to a change in length of the joint arms 8, this leads to a displacement of the inner ring 3 with respect to the outer mount 1 in the x direction (see arrow A). This consequently results in aberrations and coma.

Figure 2:
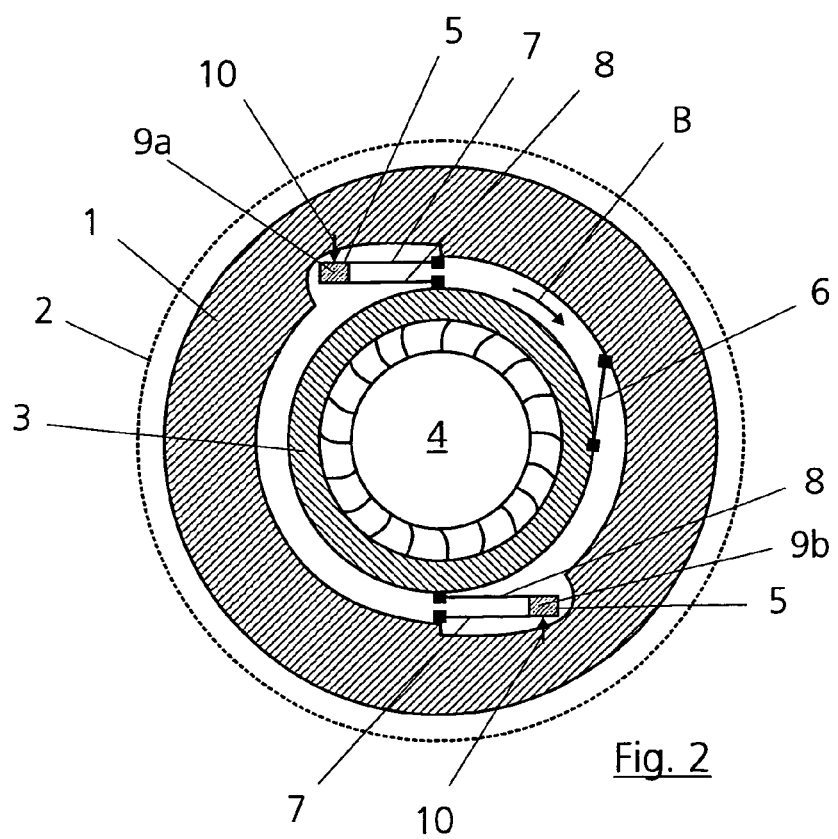
FIG. 2 shows a lens as the optical element of an objective as shown in FIG. 1 with a mounting according to the invention.

By contrast, FIG. 2 shows a connection of the joint arms 8 to the inner ring 3 in the case of which no displacement of the inner ring 3 with respect to the outer mount 1 occurs, but merely a rotation in the direction of the arrow B about the center of the optical element.

As can be seen, the longitudinal extents of the two joint arms 8—starting from their respective connecting points on the inner ring 3—lie in opposite directions. While the upper joint arm 8 in the drawing extends from its connecting point on the inner ring 3 to the left to the adjusting part 9a, the lower joint arm 8 in the drawing extends in the positive x direction from its tangential connection on the inner ring 3 in the direction of the adjusting part 9b. Furthermore, the joint arm 6 extends from its connecting point on the inner ring 3 upward to the outer mount 1. By suitable setting of the length of the joint arm 6 in dependence on the lengths of the joint arms 8 and the typical temperature distributions, it is possible to achieve the effect that the inner ring 3 rotates about the center of the optical element and is not laterally displaced when there is a change in temperature.

Figure 3A:
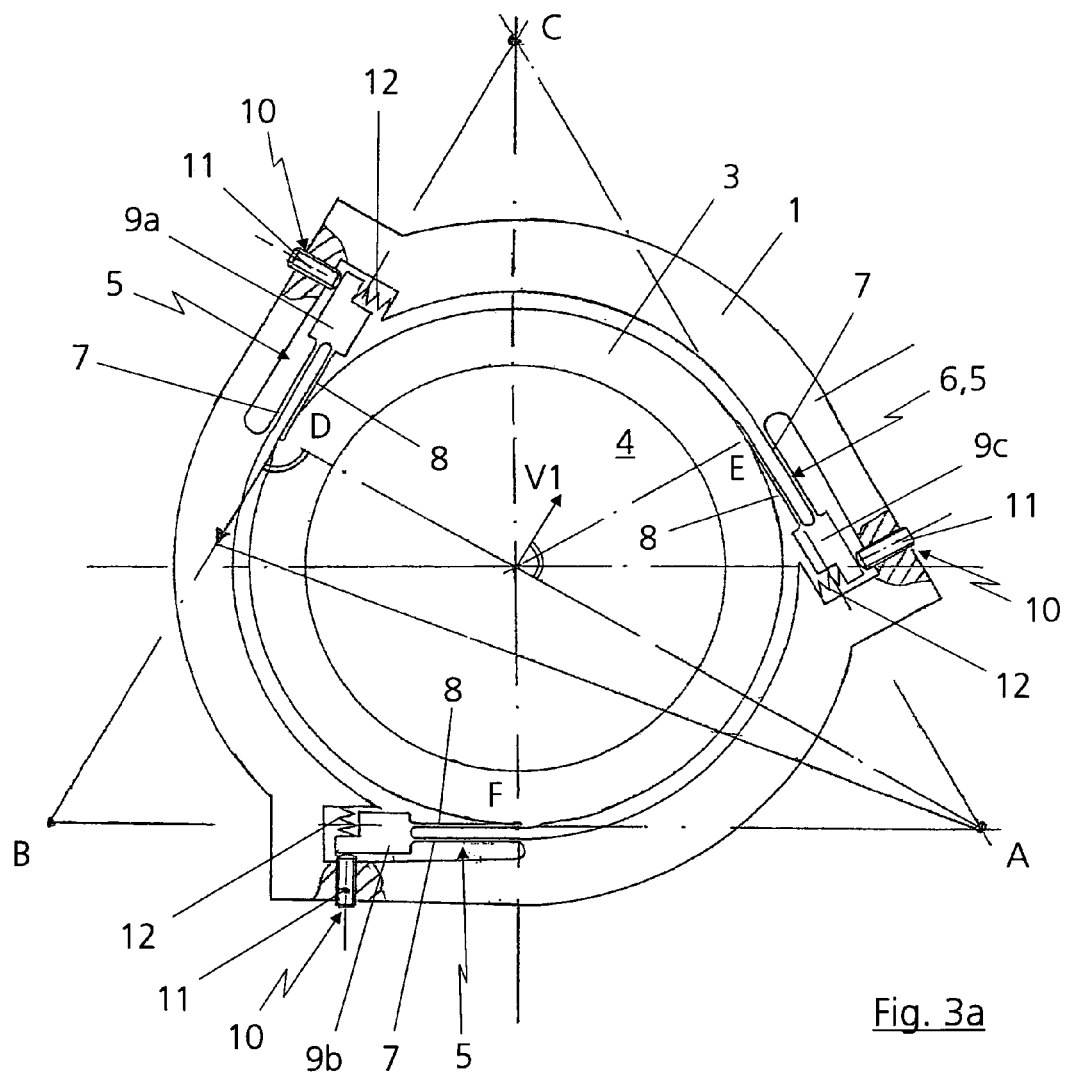
FIG. 3a shows an optical element of an objective with a second mounting according to the invention.

FIG. 3a shows a very advantageous development of the invention. As can be seen, the swivel joint 6 according to FIGS. 1 and 2 is in this case likewise formed as an adjusting joint 5 with two joint arms 7 and 8 and an adjusting part 9c lying in between. At the same time, the distribution of the three adjusting joints 5 has been performed symmetrically around the circumference at intervals of 120°.

The adjustment of the inner ring 3 with respect to the outer mount 1 takes place in a way similar to in the case of FIG. 2, but now in such a way that there is no longer any preferential direction. If, for example, the two adjusting parts 9b and 9c are held in place, a momentary center of rotation A is obtained for the inner ring 3 in a way similar to in the case of the mounting according to the prior art. With actuation of the manipulator 10 on the adjusting lever 9a, a displacement of the inner ring 3 in the direction of $v_1$ can then be applied. If the adjusting parts. 9a and 9b are then held in place, the center of rotation B is obtained for the inner ring 3 in a way analogous to the center of rotation A. With the actuation of the manipulator 10 on the adjusting part 9c, a displacement of the inner ring 3 in the direction $v_2$ can consequently be achieved (see FIG. 3b) If the adjusting parts 9a and 9c are held in place, a momentary center of rotation C is obtained for the inner ring 3 in a way analogous to the centers of rotation A and B. With the manipulator 10 on the adjusting part 9b, a displacement in the direction of $v_3$ can then be applied to the inner ring 3 (see FIG. 3b).

Figure 3B:
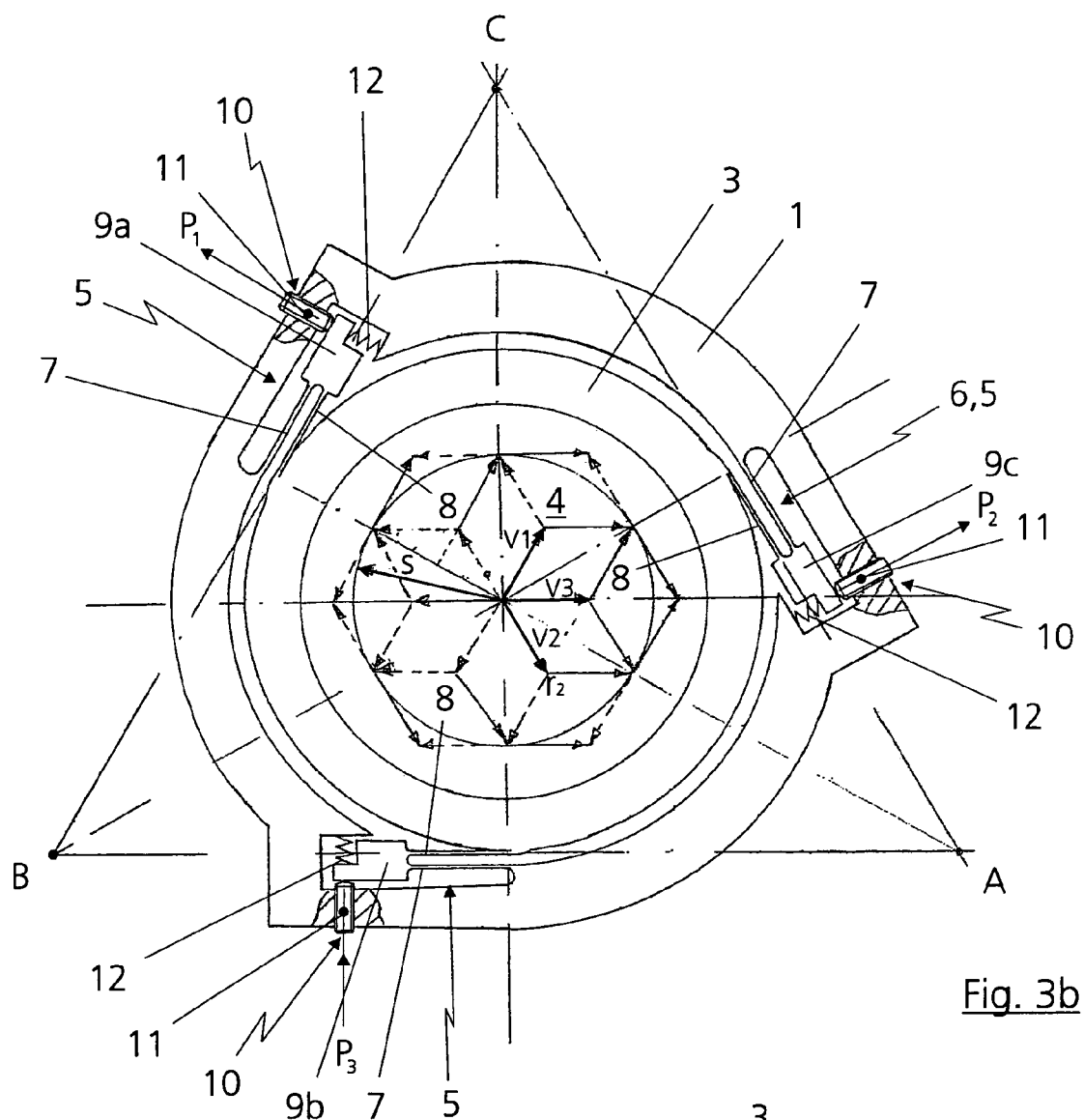
FIG. 3b shows the optical element as shown in FIG. 3a with displacement vectors depicted.

It can also be seen from FIG. 3b that the displacement vectors $v_1$, $v_2$ and $v_3$ only have to amount to s/(2 ·cos 30°)≈0.58·s in order to form in vector addition a hexagon which comprises the circular adjusting region with the radius s.

The adjusting path $P_1$ on the adjusting part 9a, which determines the deformation and the stresses in the joint arms 8, can be determined from the required minimum reduction ratio $i_{min}$ and the displacement vector $v_1$.

$P_1/v_1 = i_{min}$ (conventional xy manipulator)

$P_1 = i_{min} \cdot s/(2 \cdot \cos 30°) \approx 0.58 \cdot i_{min} \cdot s$ (xy manipulator as shown in FIGS. 3a, 3b)

The adjusting path $p_1$ on the adjusting part 9a is approximately 60% of the adjusting path on the conventional xy manipulator. The same applies to the adjusting paths $p_2$ and $p_3$ on the adjusting parts 9b and 9c.

If the same stresses as in the prior art are allowed in the joint arms 8, the length of the joint arms 8 can be shortened to approximately 0.58 of the existing value, whereby the lateral stiffness of the inner ring connection is increased to at least 1.7 of the existing value.

This measure also allows an increase in the natural frequency with which the inner ring 3 together with the lens 4 vibrates with respect to the outer mount 1.

In addition to the two effects mentioned above, there is also the more favourable loading of the joint arms 8 during the displacement, since, for example for the adjusting part 9a, the displacement for the point of application D of the joint arm 8 on the inner ring 3 takes place perpendicularly in relation to the straight connecting line from the point of application D to the momentary center of rotation A for the inner ring 3. The joint arm 8 is therefore not subjected to the loading of additional transverse deformation as it is in the case of the solution according to the prior art.

The same also applies to the joint arms 8 of the adjusting parts 9b and 9c when there are rotations about the momentary centers of rotation B and C with the points of application E and F.

As can be seen, the centers of rotation A, B and C lie significantly further outside in comparison with the solution according to the prior art, and consequently produce significantly greater radii. This means that the quasi linearity in the case of displacements of the inner ring 3 with respect to the outer mount 1 is likewise significantly increased.

The fact that there is no longer any preferential direction when there are adjustments means that the entire system is more stiff with respect to natural vibrations.

In comparison with a prior-art displacement of the inner ring 3 transversely to the z axis with respect to the outer mount 1 when there are changes in temperature, the conversion of the changes in length of the joint arms into a uniform turning direction has the effect—as mentioned— that there is only a corresponding rotation of the inner ring 3 with respect to the outer mount 1 about the center of the optical element, without displacements. However, rotations of this type generally do not lead to aberrations, in particular not in the case of a lens 4 as the optical element.

In a very advantageous way, the optical element 4 with the mounting according to the invention can be used in the case of a projection objective in microlithography for the production of semiconductor elements.

The joint arms 7 and 8 may be formed in each case as leaf springs, at the free end of which there is respectively the adjusting part 9a, 9b and 9c, by means which the two leaf springs 7 and 8 are connected to each other.

In a way similar to in the case of the exemplary embodiment as shown in FIG. 2, the joint arms or leaf springs 8 in the case of the exemplary embodiment as shown in FIGS. 3a/3b are articulated here on the inner ring 3 in such a way that changes in length of the joint arms 8 are converted into a uniform turning direction of the inner ring 3 with respect to the outer mount 1. In the exemplary embodiment represented in FIG. 3a, this means that the points of application D, E and F or the connecting points on the inner ring 3 are chosen such that, from there, the joint arms 8 are directed tangentially away in the clockwise direction from the inner ring 3. It goes without saying that the reverse arrangement is also possible, in which case of course all three joint arms must in turn have the same direction.

The manipulators 10 may in each case have an adjusting screw 11, which is screwed into the outer mount 1. With their free ends, adjusting screws 11 act on the adjusting parts 9a, 9b and 9c and, as already explained, lead to a corresponding displacement for these when there is a corresponding adjustment of the adjusting screws 11. Spring elements 12 serve as returning elements for the adjusting parts 9a, 9b and 9c. On the side facing away from the adjusting screws 11, the spring elements 12 respectively act on the adjusting parts 9a, 9b and 9c and, on the other side, they are supported on the outer mount 1.

Figure 4:
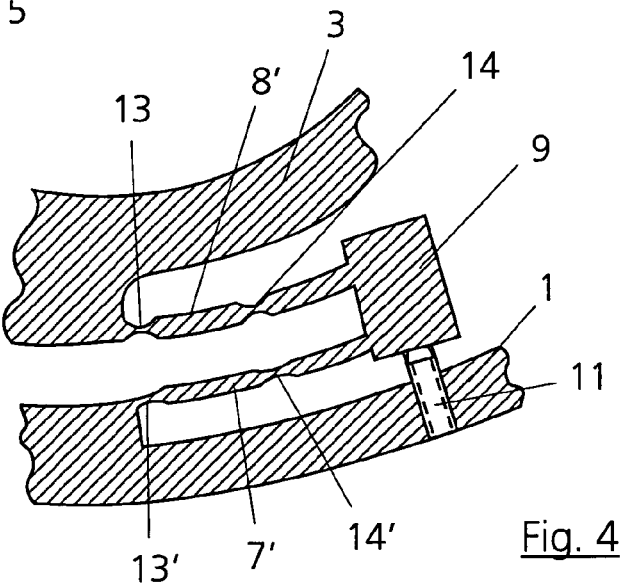
FIG. 4 shows an enlarged representation of a type of mounting with discrete solid-state joints.

In FIG. 4, a detail of an adjusting joint 5 is represented in an enlarged representation, the joint arms 7 and 8 being formed as joint arms with discrete solid-state joints 7' and 8' instead of in the form of leaf springs. As can be seen, the joint arm 8' has two constrictions 13 and 14, which are arranged at a distance from each other. The constriction 13 represents the articulation with the inner ring 3, while the constriction 14 establishes the connection with respect to the outer mount 1. In the same way, the leaf spring forming the joint arm 7 is replaced by a joint arm 7' with discrete joints. The joint arm 7' likewise has two constrictions 13' and 14' and is connected at one end to the outer mount 1 and at the other end to the adjusting part 9. On account of their small cross section, the two constrictions 13 and 14 represent jointed articulations.

The advantage of the discrete solid-state joints 13, 13', 14 and 14' in comparison with the leaf springs is that a greater stiffness in the tangential direction is achieved, although a greater freedom of movement in the radial direction is created at the same time. The longer the joint arms 7' and 8' are, or the further apart the two constrictions 13, 13' and 14, 14' lie, the greater the freedom of movement in the radial direction becomes, while no losses in stiffness in the tangential direction occur however. A further advantage is that the constrictions 13 or 13' and 14 or 14' as points of articulation can be made thinner in comparison with the configuration of the joint arms 7 and 8 as leaf springs, whereby a radially softer connection with high tangential stiffness is likewise still achieved.

In the case of the exemplary embodiment represented in FIG. 4, both joint arms 7' and 8' are provided with solid-state joints in the form of constrictions 13 or 13' and 14 or 14'. It goes without saying that, if need be, it may also be adequate for only one of the two joint arms, for example the inner joint arm 8, to be replaced by a solid-state joint 8', while the joint arm 7 remains formed as a leaf spring. It is also conceivable for only one constriction to be provided for each joint arm.

What is claimed is:

1. An objective comprising at least one optical element, said optical element being mounted in an inner ring, said inner ring being connected to an outer mount making a connection, said connection comprising articulated arms being roughly tangential to said inner ring, wherein temperature-induced changes in length of said articulated arms result in a rotation of said inner ring with respect to said outer mount, said rotation being roughly around the center of said optical element.

2. An objective comprising at least one optical element, said optical element being mounted in an inner ring, said inner ring being connected to an outer mount elastically making an elastic connection, said elastic connection comprising a manipulator and at least one swivel joint, said manipulator being capable to displace the inner ring in at least one direction and comprising at least two articulated joints, said at least two articulated joints and said at least one swivel joint being provided with articulated arms, said articulated arms being roughly tangential to said inner ring and providing said elastic connection, wherein temperature-induced changes in length of said articulated arms result in a rotation of said inner ring with respect to said outer mount, said rotation being roughly around the center of said optical element.

3. The objective as claimed in claim 2, wherein the inner ring is displaced in a direction perpendicular to an optical axis.

4. The objective as claimed in claim 2, wherein the at least one swivel joint is likewise formed as an adjusting joint with a manipulator member.

5. The objective as claimed in claim 4, wherein three adjusting joints are provided, arranged such that they are distributed around the circumference of said inner ring.

6. The objective as claimed in claim 5, wherein said adjusting joints are arranged such that they are distributed around the circumference at intervals of 120°.

7. The objective as claimed in claim 2, wherein the at least one swivel joint is formed as an adjusting joint with a manipulator member and with joint arms.

8. The objective as claimed in claim 7, wherein said joint arms of the adjusting joints are formed as leaf springs.

9. The objective as claimed in claim 8, wherein each adjusting joint is provided with at least two leaf springs with an adjusting part lying in between.

10. The objective as claimed in claim 9, wherein one leaf spring is articulated on said inner ring and a second leaf spring is articulated on said outer mount.

11. The objective as claimed in claim 10, wherein said two leaf springs lie at least approximately parallel to each other.

12. The objective as claimed in claim 10, wherein said adjusting joints and their joint arms are provided with discrete solid-state joints.

13. The objective as claimed in claim 12, wherein one solid-state joint is articulated on said inner ring and the second solid-state joint is articulated on said outer mount.

14. The objective as claimed in claim 13, wherein said solid-state joints are respectively formed as constrictions.

15. The objective as claimed in claim 1, wherein said displacement device are manipulator members arranged in said outer mount.

16. The objective as claimed in claim 15, wherein said manipulator members respectively act on an adjusting part.

17. The objective as claimed in claim 16, wherein said manipulator members are provided with adjusting screws, which are arranged in said outer mount and act on said adjusting parts.

18. The objective as claimed in claim 17, wherein said adjusting parts are provided with returning elements acting against the adjusting direction of said adjusting screws.

19. The objective as claimed in claim 18, wherein said returning elements are formed as spring elements.

20. The objective as claimed in claim 1 or 2, wherein it is formed as a projection objective in microlithography.

21. The objective as claimed in claim 1 or 2, wherein the optical element is formed as a lens or mirror.

* * * * *

UNITED STATES PATENT AND TRADEMARK OFFICE
CERTIFICATE OF CORRECTION

PATENT NO. : 7,239,462 B2  Page 1 of 1
APPLICATION NO. : 11/063113
DATED : July 3, 2007
INVENTOR(S) : Rau et al.

It is certified that error appears in the above-identified patent and that said Letters Patent is hereby corrected as shown below:

Column, Line 40

Please delete "… DE 199 03 295 A1 …" and insert --… DE 199 01 295 A1 …--

Column 4, Line 22

Please delete "… parts. 9a and 9b …" and insert --… parts 9a and 9b …--

Column 4, Line 27

Please delete "… (see FIG. 3b) If …" and insert --… (see FIG. 3b). If …--

Column 4, Line 38

Please delete "… path P1 on the …" and insert --… path p1 on the …--

Signed and Sealed this

Twenty-second Day of January, 2008

JON W. DUDAS
*Director of the United States Patent and Trademark Office*